No. 657,972. Patented Sept. 18, 1900.
T. J. WARD.
MUD GUARD.
(Application filed May 7, 1900.)
(No Model.)

Witnesses
F. E. Alden
Chas. S. Hyer

Thomas J. Ward Inventor
by C. A. Snow & Co.
Attorneys

UNITED STATES PATENT OFFICE.

THOMAS JOS. WARD, OF DUBUQUE, IOWA.

MUD-GUARD.

SPECIFICATION forming part of Letters Patent No. 657,972, dated September 18, 1900.

Application filed May 7, 1900. Serial No. 15,758. (No model.)

*To all whom it may concern:*

Be it known that I, THOMAS JOS. WARD, a subject of the Queen of Great Britain, residing at Dubuque, in the county of Dubuque and State of Iowa, have invented a new and useful Mud-Guard, of which the following is a specification.

This invention relates to mud-guards, which have a general application, but particularly intended for use on what are known as "go-carts;" and the object of the same is to provide a simple and effective device of this character capable of adjustment and to move automatically or without requiring manual arrangement in crossing curbs or sidewalks and also protecting the dress of the attendant or operator of the cart and wherein the parts can be easily assembled in operative relation to the wheels of the cart.

The invention consists in the construction and arrangement of the several parts, which will be more fully hereinafter described and claimed.

Figure 1:
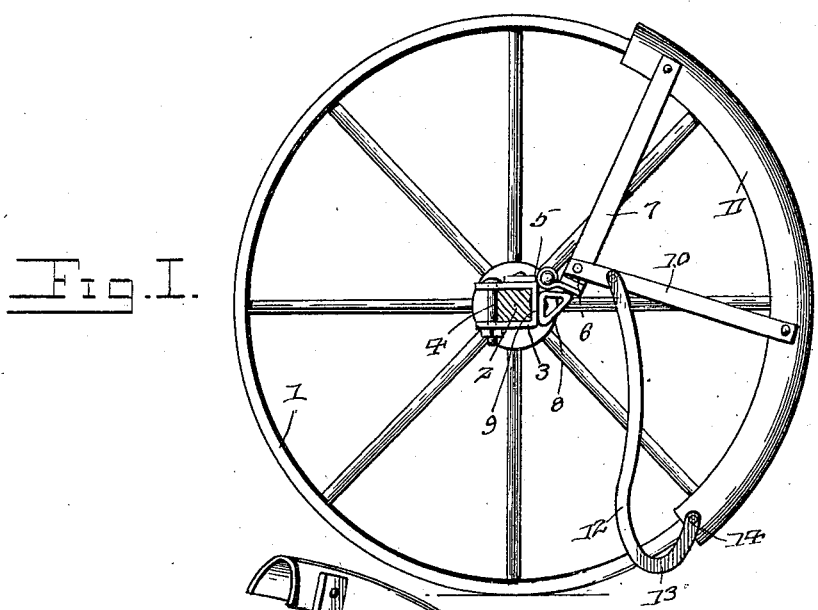
Figure 2:
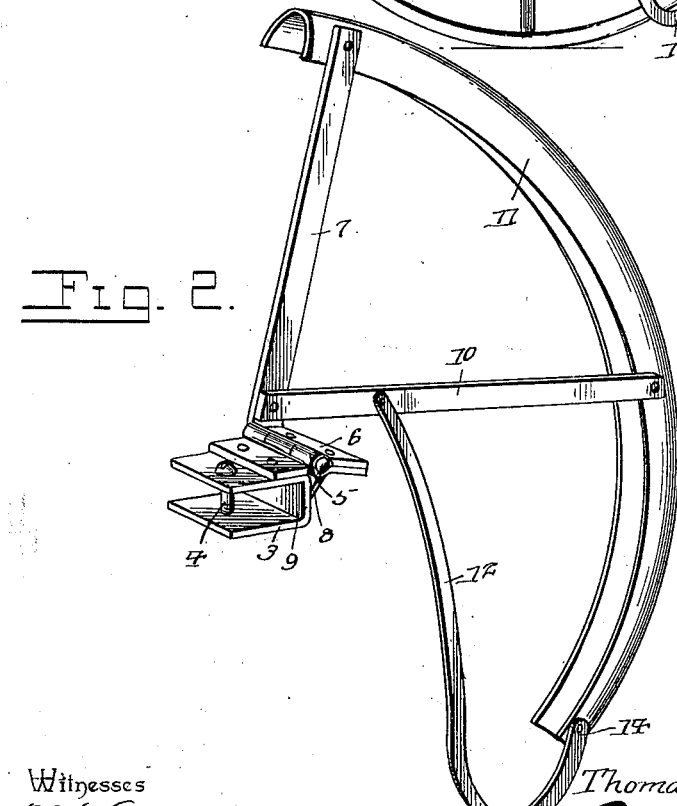
Figure 3:
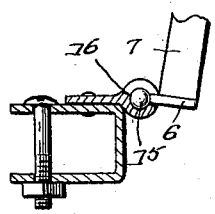

In the drawings, Figure 1 is a side elevation of a spring looking from the inside and showing the improved fender or guard applied thereto in operative position. Fig. 2 is a perspective view of the improved guard shown detached. Fig. 3 is a sectional view of a portion of the device, showing a different form of joint for connecting the clip and braces thereof.

Similar numerals of reference are employed to indicate corresponding parts in the several views.

The numeral 1 designates a wheel of any preferred or usual character, and 2 the axle on which it runs. To the said axle a U-shaped clip 3 is removably secured by a bolt 4, and, as shown by Figs. 1 and 2, a leaf-hinge 5 is secured to the upper member of the said clip and to the inner angular end 6 of an upwardly-extending radial brace 7. The entire guard is prevented from falling below a predetermined point by an angle-stop 8, projecting rearward from the rear vertical connecting member 9 of the clip and against which the angular end 6 has bearing. A supplemental brace 10 is secured to the inner extremity of the brace 7 and extends outwardly therefrom in a straight line, and the outer ends of both braces are attached to the inner side of a semitubular guard 11, which is of a length about equal to one-quarter of the circumference of the wheel, and by means of the hinge connection it may be thrown over or raised until the rear leaf of said hinge rests on top of that secured to the upper member of the clip, and thus the guard will be held in elevated position until readjusted in normal working position, as shown by Fig. 1.

The movable mounting of the guard will also be found very convenient in pushing the cart up or down stairs, and to facilitate this operation and also in crossing curbs of pavements an arm 12 is employed in connection with the device and has its upper end secured to the inner portion of the brace 10 and is formed into a U-shaped lower extremity 13, which depends below the lower end of the guard and has its lower terminal 14 secured to the lower end of the said guard. The U-shaped extremity of the arm also extends out farther than the rim of the wheel, so that it will be in engageable position and operate in the manner set forth without requiring continuous hand adjustment, and it will be understood that after the guard is so moved it will return to its normal elevation when free to do so.

In Fig. 3 a different or modified form of hinge connection is shown, and consists in providing the angular end 6 of the brace 7 with a ball 15 and the upper member of the clip with a socket 16 to movably receive the said ball, and thereby obtain the same hinged operation.

Other variations in the form, size, proportions, and minor details may be resorted to without departing from the principle of the invention.

Having thus described the invention, what is claimed as new is—

1. The combination with a wheel and axle, of a hinged mud-guard having a depending arm extending below the lower end of said guard.

2. The combination with a wheel and axle, of a mud-guard movably attached to the axle and having an arm with a lower depending extremity, and a stop to limit the lower movement of the said arm.

3. The combination with a wheel and axle, of a clip removably applied to the axle and having a rear stop, a mud-guard movably connected to the rear portion of the clip and limited in its downward movement by the said stop, and an arm attached to the guard and having a lower depending curved extremity.

In testimony that I claim the foregoing as my own I have hereto affixed my signature in the presence of two witnesses.

THOMAS JOS. WARD.

Witnesses:
F. M. HOPKINS,
FRANK GAFFNEY.